United States Patent
Nagai et al.

(10) Patent No.: US 8,754,563 B2
(45) Date of Patent: Jun. 17, 2014

(54) ROTATING MACHINE PROVIDED WITH STATOR CORE

(75) Inventors: Kazuyoshi Nagai, Shizuoka (JP); Akira Suzuki, Shizuoka (JP)

(73) Assignee: Samsung Electro-Mechanics Japan Advanced Technology Co., Ltd, Shizuoka (JP)

(*) Notice: Subject to any disclaimer, the term of this patent is extended or adjusted under 35 U.S.C. 154(b) by 423 days.

(21) Appl. No.: 13/160,359

(22) Filed: Jun. 14, 2011

(65) Prior Publication Data

US 2011/0304238 A1 Dec. 15, 2011

(30) Foreign Application Priority Data

Jun. 15, 2010 (JP) .................................. 2010-136353
Dec. 3, 2010 (JP) .................................. 2010-270368

(51) Int. Cl.
*H02K 1/14* (2006.01)
*H02K 15/02* (2006.01)

(52) U.S. Cl.
USPC ........... 310/216.091; 310/216.092; 310/67 R; 360/99.01; 360/98.07; 360/99.04; 360/99.08

(58) Field of Classification Search
USPC ........... 310/216.092, 67 R; 360/98.07, 99.01, 360/99.04, 99.07
See application file for complete search history.

(56) References Cited

U.S. PATENT DOCUMENTS

| | | | | |
|---|---|---|---|---|
| 5,675,452 A | * | 10/1997 | Nigam | ........................ 360/99.19 |
| 6,044,737 A | * | 4/2000 | Yao et al. | ........................... 83/13 |
| 6,747,387 B2 | * | 6/2004 | Fujinaka | ................ 310/216.091 |
| 6,946,760 B2 | * | 9/2005 | Crapo et al. | .................... 310/51 |

FOREIGN PATENT DOCUMENTS

JP 2009-303417 12/2009

* cited by examiner

*Primary Examiner* — Tran Nguyen
*Assistant Examiner* — Leda Pham
(74) *Attorney, Agent, or Firm* — Blank Rome LLP

(57) ABSTRACT

A recording disk is to be mounted on a hub. A base rotatably supports the hub through a bearing. A stator core is fixed to the base and includes an annular portion and a salient pole extending radially therefrom. A magnet faces the salient pole radially and is rotated with the hub. The magnet has a plurality of magnetic poles in the circumferential direction such that each of the plurality of magnetic poles faces the salient pole. The salient pole includes a rod-shaped body around which a wire is wound and a tooth portion that is provided radially outside the rod-shaped body and extends circumferentially. The circumferential end located at the end in the circumferential direction of the tooth portion is located radially inside a circumscribed circle passing through the tip located at the radially outermost end of the tooth portion.

20 Claims, 12 Drawing Sheets

60

160

260

60

ROTATING MACHINE PROVIDED WITH STATOR CORE

CROSS-REFERENCE TO RELATED APPLICATION

This application is based upon and claims the benefit of priority from the prior Japanese Patent Application No. 2010-136353, filed on Jun. 15, 2010 and 2010-270368, filed on Dec. 3, 2010, the entire content of which is incorporated herein by reference.

BACKGROUND OF THE INVENTION

1. Field of the Invention

The present invention relates to a rotating machine provided with a stator core having a salient pole.

2. Description of the Related Art

In recent years, there is a demand for further miniaturization of rotating machines, such as a hard disk drive. Under such a situation, in a rotating machine in which data is recorded, for example, magnetically, data is read and written with a magnetic head tracing over a recording disk through a slight gap between the two while the recording disk is being rotated at high speed.

In order to make such a rotating machine small in size, it is required that data is read and written with the gap between the magnetic head and the recording disk being made extremely to be small, for example, to be 10 nm or less. In addition, with the miniaturization of a rotating machine, the track pitch on the recording disk is also made small. For example, Japanese Patent Application Publication No. 2009-303417 discloses a technique in which, in order to deal with the demand for miniaturization of a brushless motor, the magnetic flux flow of a laminated core is improved to reduce a torque ripple, thereby allowing a vibration in the brushless motor to be suppressed.

Herein, if the gap between a recording/reproducing head and the surface of the recording disk is made smaller, the gap remarkably varies due to a slight vibration in the recording/reproducing head, resulting in a remarkable change in the amplitude of an output signal of the recording/reproducing head. If the trace of the recording disk is disturbed or if the amplitude of an output signal of the recording/reproducing head varies, a malfunction in reading/writing the data in a hard disk drive can occur more frequently. In addition, if the track pitch is made small, the possibility that the trace of recording tracks may be disturbed is increased when the recording/reproducing head vibrates due to a vibration. Accordingly, it is desired that a vibration occurring in a rotating machine is suppressed.

SUMMARY OF THE INVENTION

The present invention has been made in view of such a situation, and a purpose of the invention is to provide a rotating machine in which a vibration occurring during the drive of the rotating machine can be reduced by optimizing the shape of a stator core.

In order to solve the aforementioned problem, a rotating machine according to an embodiment of the present invention comprises: a hub on which a recording disk is to be mounted; a base configured to rotatably support the hub through a bearing; a stator core that is fixed to the base and includes an annular portion and a salient pole radially extending from the annular portion; and a magnet that faces the salient pole radially and is rotated with the hub. The magnet has a plurality of magnetic poles in the circumferential direction such that each of the plurality of magnetic poles faces the salient pole. The salient pole of the stator core includes a rod-shaped body around which a wire is wound and a tooth portion that is provided radially outside the rod-shaped body and extends circumferentially. In the salient pole, the circumferential end located at the end in the circumferential direction of the tooth portion is located radially inside a circumscribed circle passing through the tip located at the radially outermost end of the tooth portion. According to the embodiment, a vibration occurring during the drive of the rotating machine can be reduced.

The "rotating machine" may be a device for driving a recording disk and, for example, may be a brushless motor. Alternatively, it may be a device in which a recording disk is mounted to be rotationally driven and, for example, may be a hard disk drive.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

Figure 1:
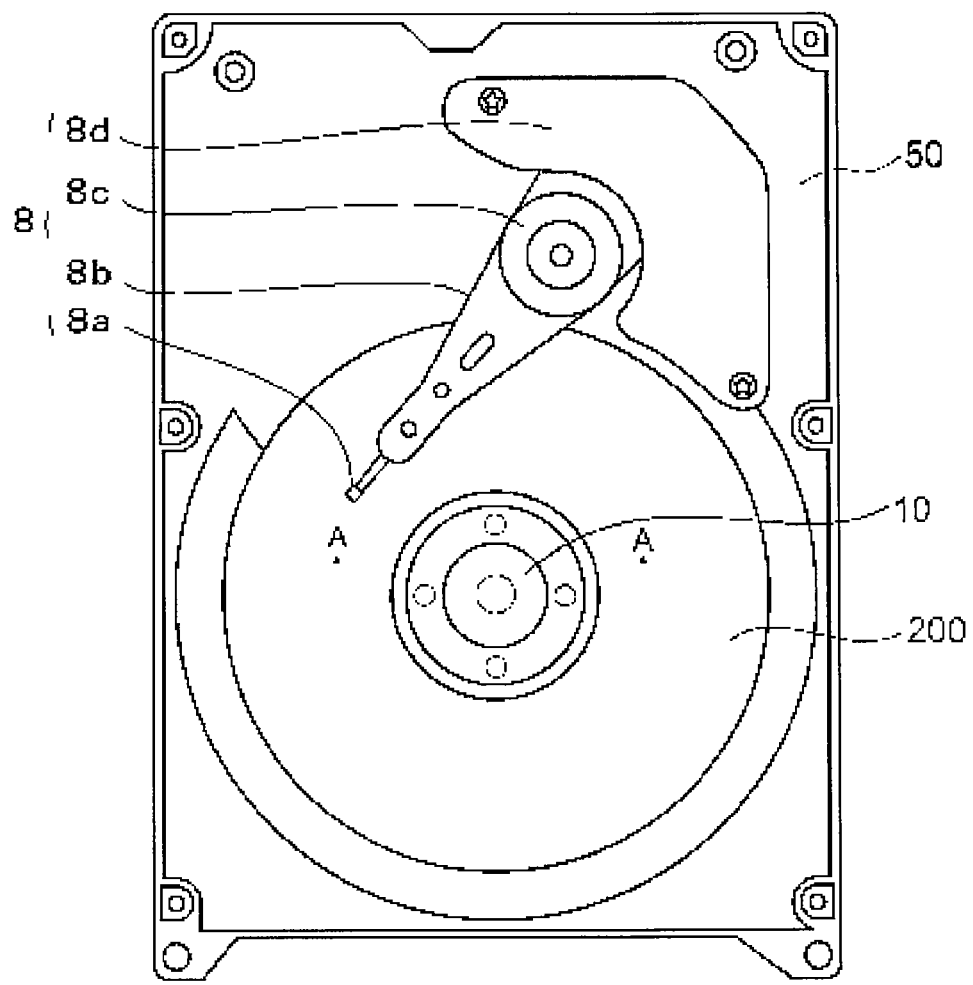
FIG. 1 is a top view illustrating a disk drive device according to an embodiment.

The invention will now be described by reference to the preferred embodiments. This does not intend to limit the scope of the present invention, but to exemplify the invention.

Hereinafter, the present invention will be described with reference to the drawings based on the preferred embodiments of the invention. The same or equivalent constituting elements and members illustrated in each drawing shall be denoted by the same reference numerals, and duplicative explanations will be omitted. Dimensions of members illustrated in each drawing are appropriately enlarged or reduced for easy understanding. Part of the members not important for describing the embodiments are omitted from each drawing.

FIG. 1 is a top view illustrating a disk drive device 100 according to an embodiment. In order to illustrate the internal configuration of the disk drive device 100, FIG. 1 illustrates the state of a top cover being removed. The disk drive device according to the embodiment is one example of rotating machines and functions as, for example, a hard disk drive in which a recording disk is to be mounted.

The disk drive device 100 comprises a base 50, a hub 10, a recording disk 200, a data read/write unit 8, and the top cover. Hereinafter, description will be made, assuming that the side where the hub 10 is mounted with respect to the base 50 is the upper side.

The recording disk 200 is mounted on the hub 10 to be rotated with the rotation of the hub 10. The base 50 is formed with an aluminum alloy being molded by die-casting. The base 50 rotatably supports the hub 10 through a bearing, which will be described later. The data read/write unit 8 includes a recording/reproducing head 8a, a swing arm 8b, a pivot assembly 8c, and a voice coil motor 8d. The recording/reproducing head 8a is fixed to the tip of the swing arm 8b to record data on the recording disk 200 and to read data therefrom. The pivot assembly 8c supports the swing arm 8b in a swing-free manner around the head rotational axis relative to the base 50. The voice coil motor 8d makes the swing arm 8b swing around the head rotational axis such that the recording/reproducing head 8a is transferred to a desired position on the recording surface of the recording disk 200. The data read/write unit 8 is structured with a known technique for controlling the position of a head.

Figure 2:
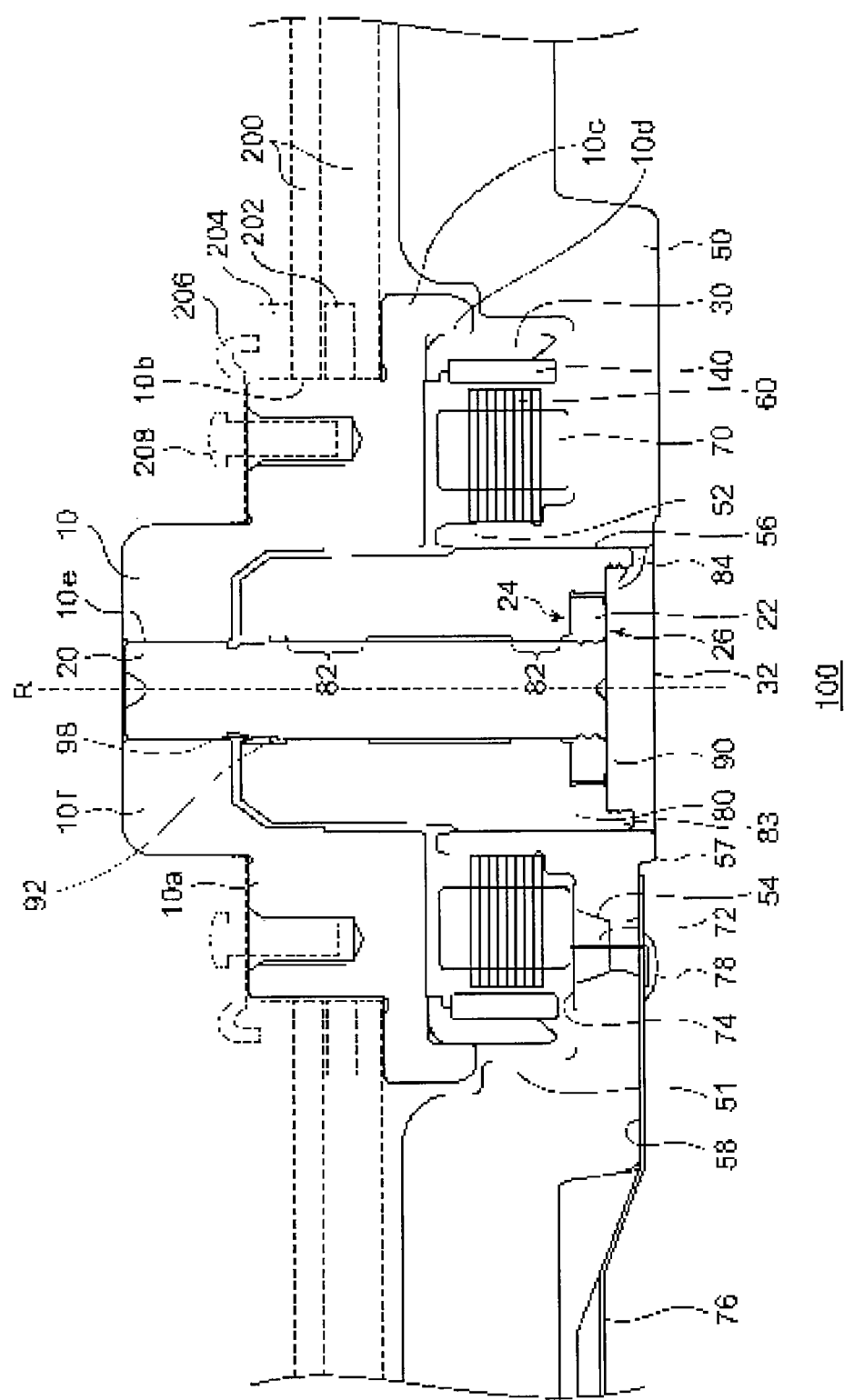
FIG. 2 is a sectional view, taken along the line A-A in FIG. 1.

FIG. 2 is a sectional view, taken along the line A-A in FIG. 1. The disk drive device 100 rotates a plurality of, for example, 3.5"-recording disks 200 that are mounted on the device 100. In each of the supposed recording disks 200, the diameter of the hole at the center is 25 mm and the thickness is 1.27 mm. The disk drive device 100 comprises a hub 10, a shaft 20, a flange 22, a yoke 30, a sealing member 32, a magnet 40, a base 50, a stator core 60, a coil 70, a sleeve 80, a plate 90, and lubricant 92.

The hub 10 is formed into a convex shape centered on the motor rotational axis R. A shaft hole 10e is formed at the center of the hub 10 and an annular central portion 10f is formed around the shaft hole 10e. Two annular steps are formed on the upper surface of the hub 10, and the central portion 10f is located on the higher step. A concave portion 10a concaved one step from the central portion 10f is annularly formed. A plurality of screw holes for a clamper 206 are provided at positions at circumferentially equal intervals on the upper surface of the concave portion 10a.

An annular disk fitting portion 10b is formed as a step concaved from the outer circumferential end of the concave portion 10a, and an annular extending portion 10c, which extends radially outward from the outer circumferential lower end of the disk fitting portion 10b, is formed. The annular extending portion 10c includes a hanging portion that hangs toward the base 50, and the yoke 30 is fixed to the inner circumferential surface 10d of the hanging portion.

The central holes of the two recording disks 200 are fitted into the cylindrical disk fitting portion 10b, which is a portion of the hub 10 protruding upward. Of the two recording disks 200, the lower recording disk 200 is mounted on the annular extending portion 10c radially extending from the lower end of the disk fitting portion 10b.

An annular first spacer 202 is inserted between the two recording disks 200. The clamper 206 fixes the two recording disks 200 and the first spacer 202 by pressing them against the hub 10 through an annular second spacer 204. The clamper 206 is fixed with respect to the concave portion 10a of the hub 10 by the plurality of clamper screws 208 after the central hole of the clamper 206 has been extrapolated into the central portion 10f of the hub 10.

The yoke 30 is fixed by adhesion to the inner circumferential surface of the hub 10. The yoke 30 has a flange portion extending radially inward from the upper end thereof and is formed into an L-shape. The upper surface of the flange of the yoke 30 is also fixed by adhesion to the hub 10, thereby securing an adhesive surface.

The magnet 40 is fixed by adhesion to the inner circumferential surface of the yoke 30. The magnet 40 is formed of a rare earth metal, such as neodymium, iron, and boron, and radially faces the salient pole of the stator core 60. The inner circumferential surface of the magnet 40 is provided with a twelve-pole drive magnetization in the circumferential direction thereof. That is, the magnet 40 has twelve magnetic poles at positions at circumferentially equal intervals, the positions facing those of the salient poles of the stator core 60. The yoke 30 and magnet 40 are rotated with the hub 10.

One end of the shaft 20 is firmly attached to the shaft hole 10e of the hub 10 by a combination of press fitting and adhesion. The annular flange 22 is press-fitted into the other end of the shaft 20.

An annular protruding portion 52, which protrudes upward centered on the motor rotational axis R, is provided in the base 50. The outer circumferential surface of the annular protruding portion 52 is formed into a cylindrical shape centered on the motor rotational axis R. A bearing hole 56 is formed on the inner circumferential surface of the annular protruding portion 52 and the sleeve 80 is fixed by adhesion thereto. A through-hole is formed in the sleeve 80 and the shaft 20 is housed therein. The plate 90 is fixed to the inner circumferential surface of a circumferential lower end portion 83 of the sleeve 80. A conductive resin material 84 is applied near to the joint portion between a bearing unit for the plate 90 and sleeve 80, and the base 50. An opening 57 located at the lower end of the bearing hole 56 is sealed by pasting the sealing member 32 thereto. The base 50 has a width-increased portion 51 axially facing the hanging portion of the hub 10.

The lubricant 92 is injected between the shaft 20 and the flange 22 and between the sleeve 80 and the plate 90. The shaft 20, flange 22, lubricant 92, sleeve 80, and plate 90 function as a bearing unit for rotatably supporting the hub 10. That is, the base 50 rotatably supports the hub 10 through the bearing unit. The bearing unit is fixed to the bearing hole 56 of the base 50.

A pair of herringborn-shaped radial dynamic pressure grooves 82, which are vertically spaced apart from each other, are formed in the through-hole of the sleeve 80, i.e., on the inner circumferential surface of the sleeve 80. A herringborn-shaped first axial dynamic pressure groove 24 is formed on the upper surface of the flange 22, and a herringborn-shaped second axial dynamic pressure groove 26 is formed on the lower surface thereof. During the rotation of the disk drive device 100, the hub 10 and the shaft 20 are respectively supported in the radial direction and the axial direction by the dynamic pressures generated in the lubricant 92 by these dynamic pressure grooves.

A capillary seal portion 98, in which the gap between the inner circumferential surface of the sleeve 80 and the outer circumferential surface of the shaft 20 gradually expands toward the upper side, is formed near to the open end of the sleeve 80. The capillary seal portion 98 prevents leak of the lubricant 92 by capillarity.

The stator core 60 is fixed to the annular protruding portion 52 and has an annular portion and nine salient poles extending radially outward therefrom. The stator core 60 is formed by laminating multiple thin electromagnetic steel plates and by integrating them with caulking. Insulating coating is performed on the surface of the stator core 60 by electro-deposition coating or powder coating, etc. The stator core 60 is fixed by the inner circumferential surface of the annular portion being press-fitted or clearance-fitted into the outer circumference of the annular protruding portion 52.

A wire 72 forming the coil 70 is pulled out to the back surface of the base 50 through a pull-out hole 54 formed in the base 50 and soldered to a wiring 76 by solder 78. The wiring 76 is installed in a concave portion 58 more concaved than the opening 57. The wiring 76 is a flexible printed circuit board having flexibility. An insulation sheet 74 is pasted to an area of the base 50 facing the coil 70, thereby allowing the insulation between the coil 70 and the base 50 to be achieved. The three-phase coil 70 is formed by winding wires around the salient poles.

Operations of the disk drive device 100 configured as stated above will be described. In order to rotate the hub 10 in the disk drive device 100, a three-phase drive current with an approximately sine wave shape is supplied to the disk drive device 100. A magnetic flux is generated along each of the nine salient poles with the drive current flowing through the coil 70. Torque is provided to the magnet 40 by the magnetic flux, thereby allowing the hub 10 to be rotated.

Figure 3:
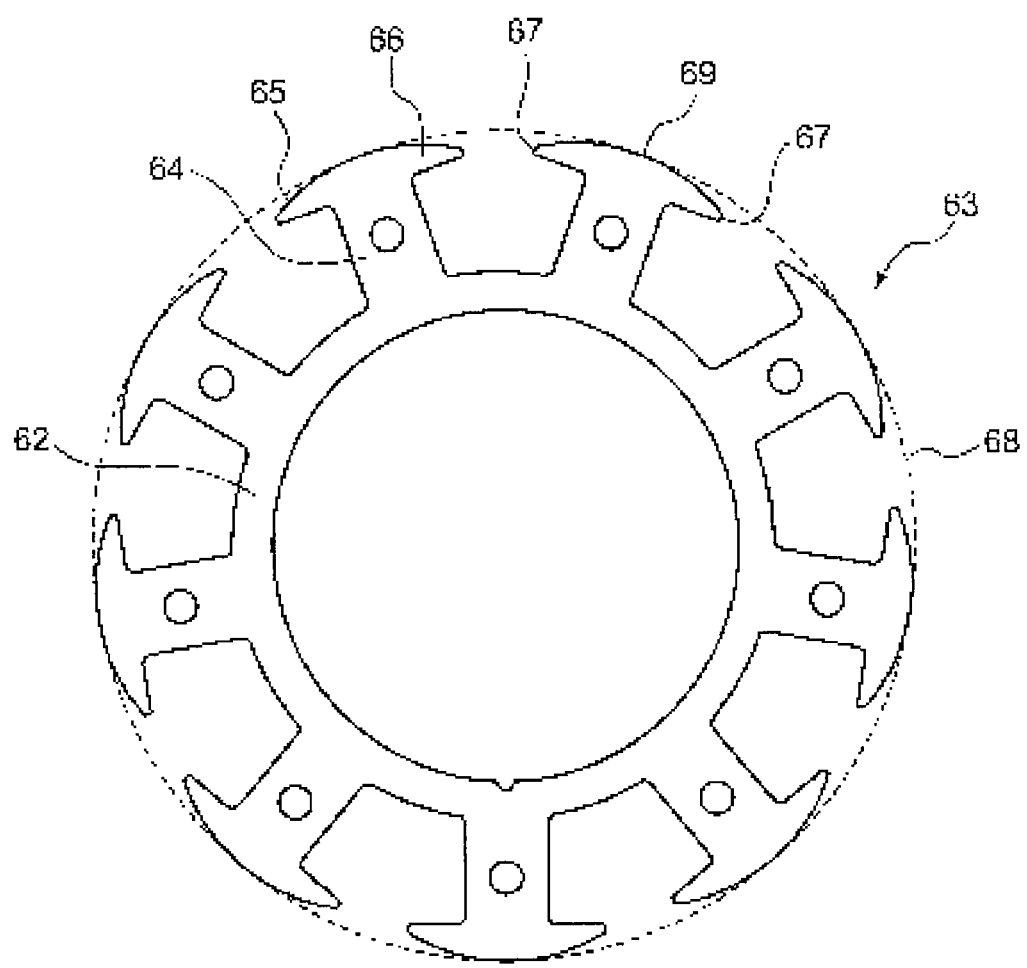
FIG. 3 is a view illustrating the top view of a stator core according to the embodiment.

FIG. 3 illustrates the top view of the stator core 60 according to the embodiment. The stator core 60 includes an annular portion 62 and a salient pole 63 radially extending therefrom. The salient pole 63 has rod-shaped bodies 64 around which wires are wound and tooth portions 66 each being provided radially outside the rod-shaped body 64 and extending radially. The outer circumferential surface 65 of the tooth portion 66 is formed into an arc shape.

In the disk drive device 100 according to the embodiment, it is preferable that a torque ripple and cogging torque are made to be small in order to reduce a vibration during the drive, which is likely to occur due to the miniaturization of the disk achieved in response to the demand. In the disk drive device 100, drive torque is generated by the interaction between the magnetic flux generated by the coil 70 and the magnetic pole of the magnet 40. A torque ripple is a pulsating component included in the drive torque and indicates a fluctuation range of the torque during rotation. Cogging torque is pulsating torque that is generated when the hub 10 and magnet 40 are operated in a non-powered state and generated due to a factor at the magnetization of the salient pole of the stator core 60 and the magnet 40.

The stator core 60 according to the embodiment is formed such that the circumferential end 67 located at the circumferential end of the tooth portion 66 is located radially inside a circumscribed circle 68 passing through a tip 69 located at the radially outermost end of the tooth portion 66. The circumferential end 67 is a tip where the circumferential end of the tooth portion 66 is pointed. Thereby, a vibration occurring during the drive can be reduced by reducing cogging torque and a torque ripple. Specifically, this will be described by using the following experimental results.

Figure 4A:
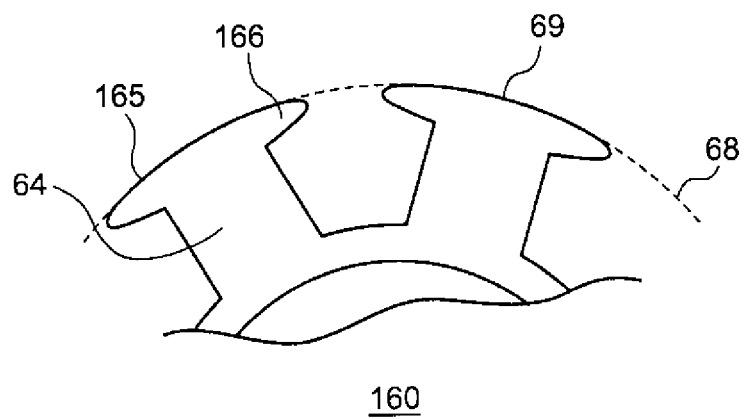
FIG. 4A is a view illustrating the salient pole of a stator core according to a conventional technique.
Figure 4B:
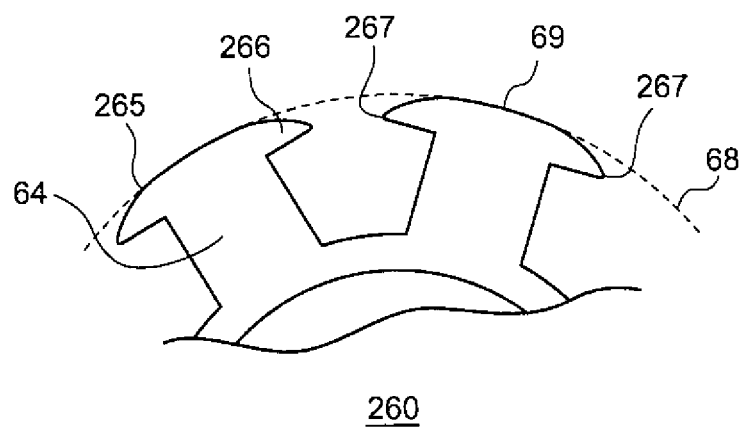
FIG. 4B is a view illustrating the stator core according to the embodiment.
Figure 4C:
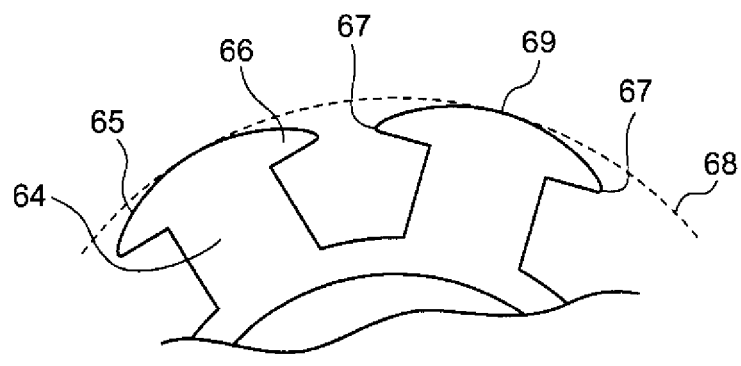
FIG. 4C is view illustrating a stator core according to another embodiment.

FIGS. 4A to 4C illustrate the shape of the salient pole of the stator core. FIG. 4A illustrates a stator core 160 according to a conventional technique, FIG. 4B illustrates a stator core 260 according to the embodiment, and FIG. 4C illustrates the stator core 60 according to another embodiment. Although the radius of the circumscribed circle 68 passing through the tip illustrated in each view is the same as each other and the size of the rod-shaped body is also the same as each other, the shape of the tooth portion is different from others.

A tooth portion 166 of the stator core 160 illustrated in FIG. 4A is formed such that the whole outer circumferential surface 165 has the same curvature radius as that of the circumscribed circle 68. Subsequently, a tooth portion 266 of the stator core 260 illustrated in FIG. 4B has a shape in which the end portion of the outer circumferential surface 165 of the tooth portion 166 in FIG. 4A has been shaved. Accordingly, the circumferential end 267 of the tooth portion 266 is located radially inside the circumscribed circle 68, although the central portion of the outer circumferential surface 265 has the same curvature radius as that of the circumscribed circle 68. Subsequently, the stator core 60 illustrated in FIG. 4C is the same as that illustrated in FIG. 3. The stator core 60 is the same as the stator core 260 in that the circumferential end 67 of the tooth portion 66 is located radially inside the circumscribed circle 68, but different in that the outer circumferential surface 65 of the tooth portion 66 of the stator core 60 has an arc shape. These stator cores 160, 260, and 60 were installed in disk drive devices to measure back electromotive forces and vibration amounts when the magnet 40 was rotated in a non-powered state.

Figure 5A:
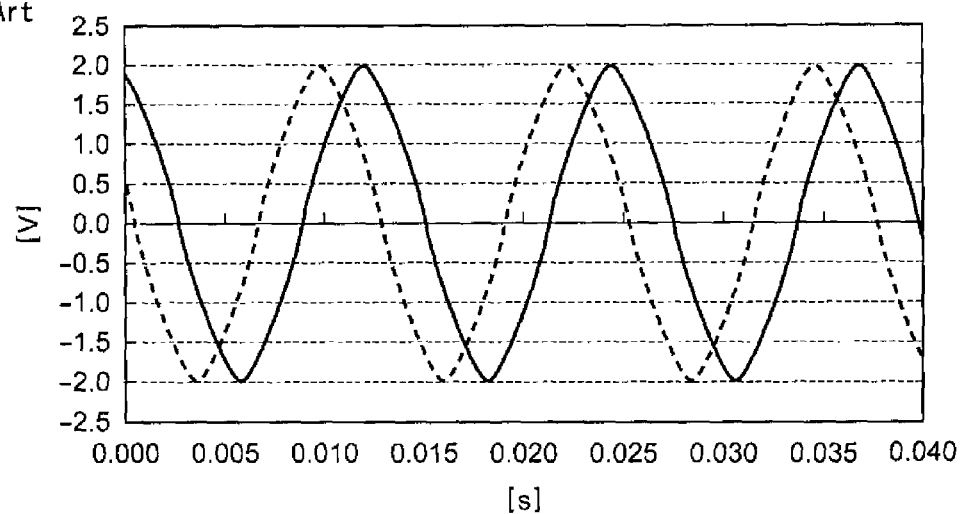
FIG. 5A is a graph illustrating a back electromotive force in accordance with the shape of the stator core illustrated in FIG. 4A.
Figure 5B:
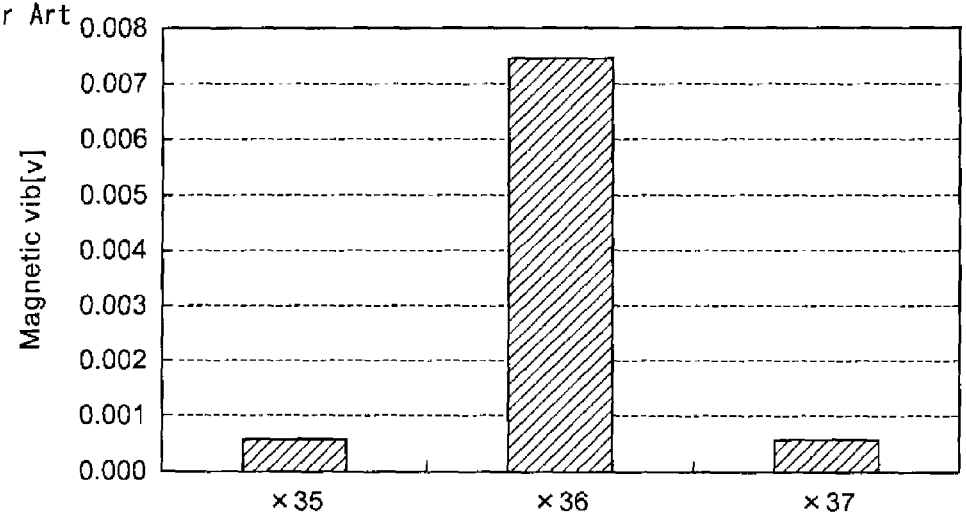
FIG. 5B is a graph illustrating a vibration amount in accordance with the shape of the stator core illustrated in FIG. 4A.
Figure 6A:
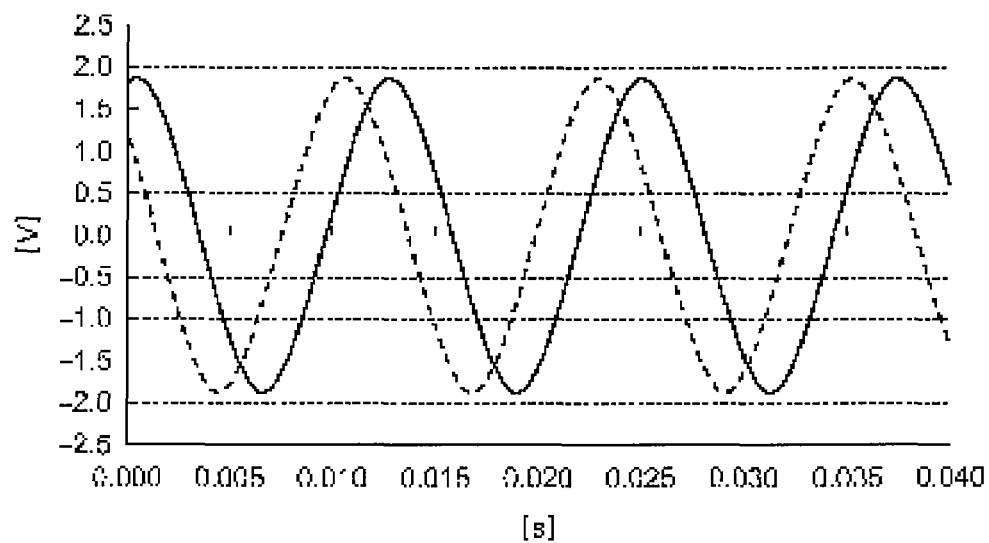
FIG. 6A is a graph illustrating a back electromotive force in accordance with the shape of the stator core illustrated in FIG. 4B.
Figure 6B:
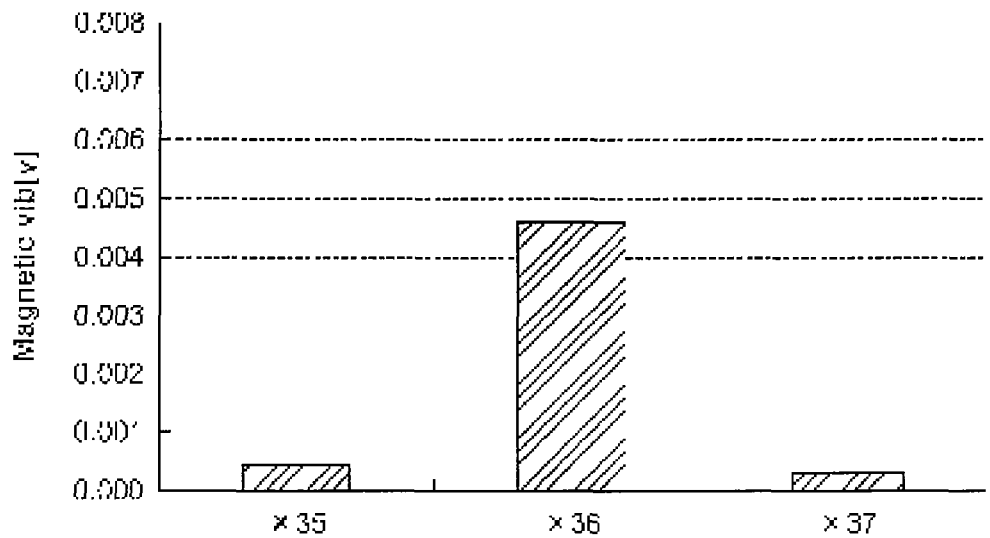
FIG. 6B is a graph illustrating a vibration amount in accordance with the shape of the stator core illustrated in FIG. 4B.
Figure 7A:
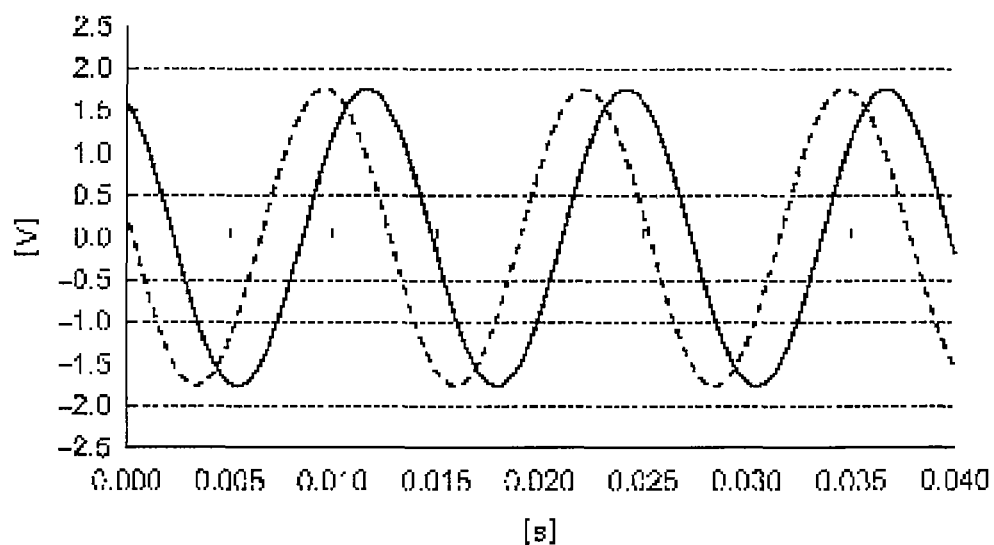
FIG. 7A is a graph illustrating a back electromotive force in accordance with the shape of the stator core illustrated in FIG. 4C.
Figure 7B:
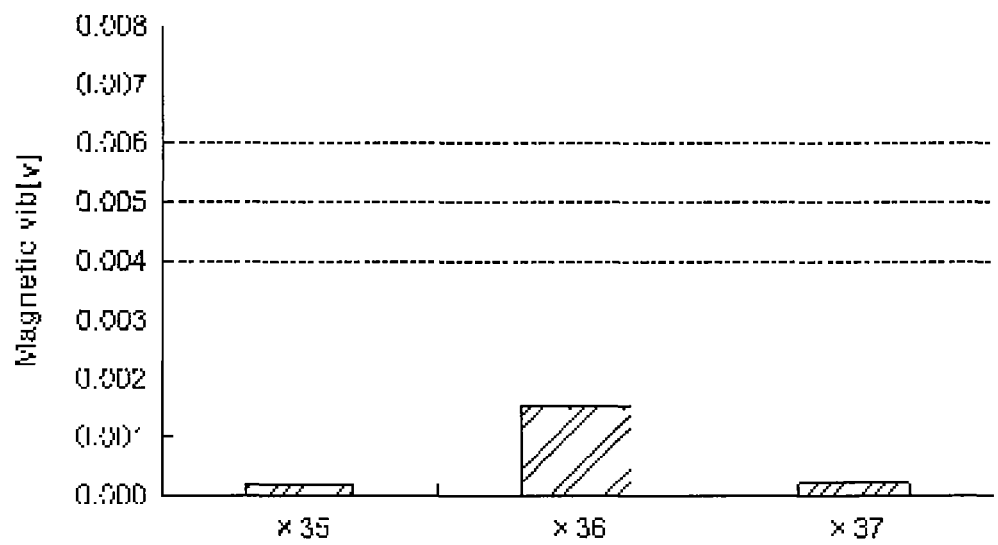
FIG. 7B is a graph illustrating a vibration amount in accordance with the shape of the stator core illustrated in FIG. 4C.

FIGS. 5A and 5B to 7A and 7B illustrate back electromotive forces and vibration amounts in accordance with the shapes of the stator core. FIGS. 5A and 5B illustrate experimental results of the stator core 160 illustrated in FIG. 4A, FIGS. 6A and 6B illustrate those of the stator core 260 illustrated in FIG. 4B, and FIGS. 7A and 7B illustrate those of the stator core 60 illustrated in FIG. 4C.

Each of FIGS. 5A, 6A and 7A illustrates a back electromotive force generated in the coil 70 when the hub 10 is rotated in a non-powered state. The back electromotive force is illustrated as a voltage waveform. As the back electromotive force has a curve closer to a sine curve, cogging torque and a torque ripple are reduced, and accordingly the hub 10 can be smoothly rotated during the drive, thereby allowing a vibration during the drive to be reduced. The back electromotive force illustrated in FIG. 5A has a shape more deviated from a sine curve than the shapes of the back electromotive forces illustrated in FIGS. 6A and 7A. The cogging torque of the stator core 160 was 1.3 mN*m and the torque ripple was 15%.

Subsequently, the back electromotive force in FIG. 6A is closer to a sine curve than that illustrated in FIG. 5A. The cogging torque of the stator core 260 was 0.75 mN*m and the torque ripple was 14.5%. When the vibration amount illustrated in FIG. 6B is compared with that illustrated in FIG. 5B, a vibration amount occurring in the disk drive device 100 using the stator core 260 is more reduced. Thereby, the present inventor has acquired the knowledge that, by arranging the circumferential end 267 of the tooth portion 266 radially inside the circumscribed circle 68, a vibration occurring in the disk drive device 100 can be reduced. The vibration amounts illustrated in FIGS. 5B, 6B, and 7B were measured as follows. An acceleration sensor is attached to an area located on the back surface of the base 50, above which the coil 70 is placed. An amplifier for amplifying an output of the acceleration sensor and a measuring instrument for calculating an output received from the amplifier, are connected to the acceleration sensor. Then, an output of the acceleration sensor is measured when a drive current is supplied to the coil 70 and the measured value is calculated as a vibration amount.

Subsequently, the back electromotive force illustrated in FIG. 7A has a shape closer to a sine curve than those of the back electromotive forces illustrated in FIGS. 5A and 6A. The cogging torque of the stator core 60 was 0.39 mN*m and the torque ripple was 14.3%. When the vibration amount illustrated in FIG. 7B is compared with those illustrated in FIGS. 5B and 6B, a vibration amount occurring in the disk drive device 100 using the stator core 60 illustrated in FIG. 7B is more reduced. Thereby, the present inventor has acquired the knowledge that, by arranging the circumferential end 67 of the tooth portion 66 radially inside the circumscribed circle 68 and by forming the outer circumferential surface 65 of the tooth portion 66 into an arc shape, a vibration occurring in the disk drive device 100 can be further reduced. Accordingly, cogging torque and a torque ripple can be reduced by arranging the circumferential end 67 of the tooth portion 66 radially inside the circumscribed circle 68, thereby allowing a vibration occurring during the drive to be reduced.

Referring back to FIG. 3, it is preferable to form the arc shape of the outer circumferential surface 65 of the tooth portion 66 such that the curvature radius of the arc shape is smaller than that of the circumscribed circle 68 passing through the tip 69, and to form the arc shape thereof such that the curvature radius thereof is approximately half that of the circumscribed circle 68. Thereby, a vibration occurring in the disk drive device 100 can be much further reduced.

The magnet poles of the magnet 40 are provided such that the circumferential dimension thereof is approximately three times that of the space between the two tooth portions 66 circumferentially adjacent to each other. For example, the angle width of the magnetic pole of the magnet 40 having twelve magnet poles is set to be 30 degrees and that of the space between the tooth portions 66 of nine salient poles is set to be 10 degrees. Because the distance between the magnet 40 and the tooth portion 66 is very small in comparison with that between the central axis of the stator core 60 and the tooth portion 66, the circumferential dimension of the magnet pole becomes approximately three times that of the space between the tooth portions 66. As a result of experiments, a torque ripple was able to be reduced and accordingly a decrease in the torque was able to be suppressed with such a configuration.

The circumferential end 67 of the stator core 60 may be located radially inside the outer diameter portion of the disk fitting portion 10b of the hub 10. Thereby, an influence by a magnetic field from the stator core 60 onto the recording disk 200 can be made small. Also, the tip 69 of the stator core 60 may be located radially inside the outer diameter portion of the disk fitting portion 10b of the hub 10.

It is assumed that the diameter of the circumscribed circle 68 passing through the tip 69 of the salient pole 63 is D1, the diameter of an inscribed circle passing through the inner circumference of the circumferential end 67 of the salient pole 63 is D2, the diameter of the outer circumference of the magnet 40 is D3, and the diameter of the inner circumference of the magnet 40 is D4. Assuming that the inner diameter of the yoke 30 is constant in this case, if the radial width (D1−D2) of the tooth portion 66 is made too large, the space for winding the coil 70 is decreased by just that much, thereby causing the torque able to be generated to be decreased. On the other hand, if the radial width (D1−D2) is made too small, magnetic saturation sometimes occur in the tooth portion 66, and there is the possibility that a torque ripple may be increased due to the occurrence of a bias in the magnetic flux distribution. In addition, if the radial width (D1−D2) of the tooth portion 66 is made too large, the thickness of the magnet 40 becomes smaller as just that much, and hence a sufficient thickness (D3−D4) of the magnet 40 cannot be secured. Accordingly, in the disk drive device 100 according to the embodiment, the relationship represented by the following equation (1) is satisfied:

$$(D3-D4)/3 < D1-D2 < D3-D4 \qquad (1).$$

Thereby, an increase in the torque ripple can be suppressed while a sufficient generation amount of torque is being secured.

Figure 8:
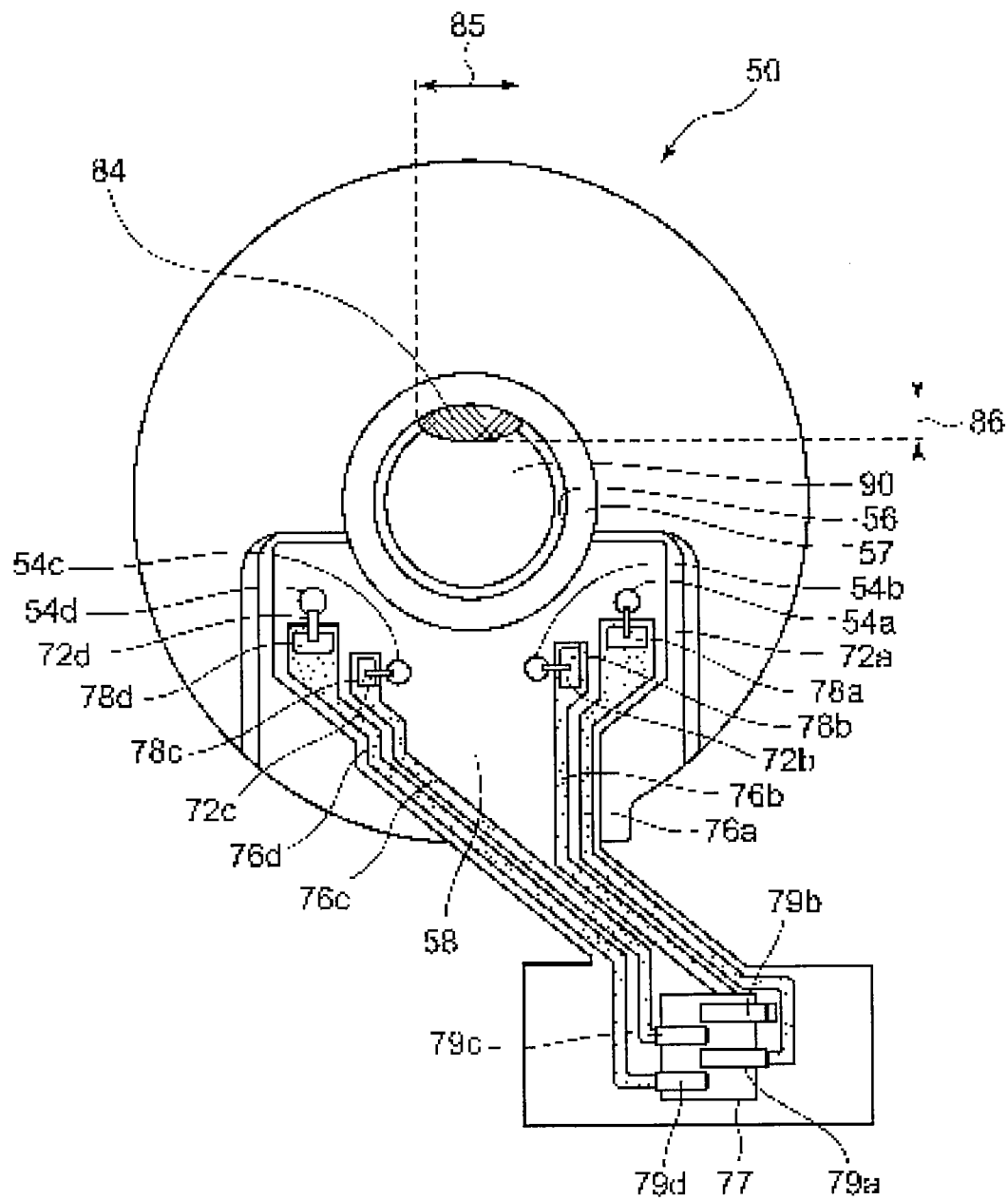
FIG. 8 is a view illustrating the lower surface of part of a base according to the embodiment.

FIG. 8 illustrates the lower surface of part of the base 50 according to the embodiment. In the present view, the wire 72 pulled out to the lower surface of the base 50 through the pull-out hole 54 and the wiring thereof are mainly illustrated.

A three-phase coil is generally formed of two pull-out wires for each phase, i.e., at least six pull-out wires, in total. If six pull-out wires are pulled out from one pull-out hole, the possibility that the pull-out wires may be brought into contact with each other or brought into contact with the base 50 is increased. If the pull-out wires are brought into contact with each other or brought into contact with the base 50, there arises the fear that desired powering cannot be performed, thereby causing the rotation to be unstable. Accordingly, in the disk drive device 100 according to the embodiment, a plurality of pull-out holes 54 are provided in the base 50 such that the pull-out wires 72 are pulled out from the plurality of pull-out holes 54. Thereby, the possibility that the pull-out wires 72 may be brought into contact with each other or brought into contact with the base 50 can be reduced.

The pull-out holes 54 includes first holes 54a, 54b, and 54c each for pulling out one pull-out wire 72, and a second hole 54d for pulling out multiple pull-out wires 72 in a bundle. In the base 50 according to the embodiment, the first holes 54a, 54b, and 54c and the second hole 54d are provided at positions within a range axially overlapping the coil 70, i.e., provided below the coil 70. The first holes 54a, 54b, and 54c are respectively provided at the positions, each of which is away from the rotational center by approximately the same distance as those of others. The second hole 54 is also provided at the position away from the rotational center by approximately the same distance as that of the first hole 54a. Thereby, the wire 72 can be easily pulled out.

Specifically, assuming that the three-phase coil 70 is formed into a Y-connection, one pull-out wire 72a, which is one end of the wire of which the first-phase coil 70 is formed, is pulled out from the first hole 54a and fixed to a wiring 76a by solder 78a. One pull-out wire 72b, which is one end of the wire of which the second-phase coil 70 is formed, is pulled out from the first hole 54b and fixed to a wiring 76b by solder 78b. One pull-out wire 72c, which is one end of the wire of which the third-phase coil 70 is formed, is pulled out from the first hole 54c and fixed to a wiring 76c by solder 78c. On the other hand, with the other ends of the wires of which the first through third-phase coils 70 are formed being the midpoint of the Y-connection, a pull-out wire 72d in which the three wires are bundled is pulled out from the second hole 54d and fixed to a wiring 76d by solder 78d. The second hole 54d may have an opening area larger than that of the first hole 54a. Thereby, while the cost is being suppressed by making three wires compatible, the pull-out holes 54 in accordance with the wires can be provided.

Subsequently, there are sometimes the cases where, when a twisted wire formed by twisting two or more wires is soldered, melted solder is moved along a twisted portion of the wires then sucked into the pull-out hole 54 due to capillarity. There arises the fear that, if the solder sucked into the pull-out hole 54 is brought into contact with the pull-out hole 54, the pull-out wire 72 for the coil 70 may be short-circuited to the base 50. Accordingly, the disk drive device 100 according to the embodiment is configured such that the smallest gap between a soldering position where the pull-out wire 72d is soldered to the wiring 76d and the position of the second hole 54d is 0.3 mm or longer. In other words, the smallest gap between the outer circumference of the solder 78d and that of the second hole 54d is made to be 0.3 mm or longer. Thereby, the possibility that the solder 78d may enter the second hole 54d can be reduced.

As illustrated in FIG. 2, the base 50 has, on the lower surface thereof, the concave portion 58 more concaved than the opening 57. The wiring 76 is fixed to the concave portion 58 and soldered. A connector 77 is arranged on the wiring 76. The connector 77 has four terminals 79a, 79b, 79c, and 79d, which are respectively connected to the wirings 76a, 76b, 76c, and 76d.

Conventionally, the connector 77 is manually soldered to the wiring 76 after the wiring 76 has been pasted to the lower surface of the base 50, in the assembling process of the wiring 76 and the connector 77. Accordingly, the connector 77 is sometimes deformed due to the heat of soldering iron. In a method of producing the disk drive device 100 according to the embodiment, it is made that the wiring 76 is fixed to the concave portion 58 after the connector 77 has been soldered onto the wiring 76 by reflow. Thereby, the possibility that the connector 77 may be deformed is reduced, and the work can be easily mechanized. Accordingly, the efficiency of the work for installing into the base 50 can be increased.

Figure 9:
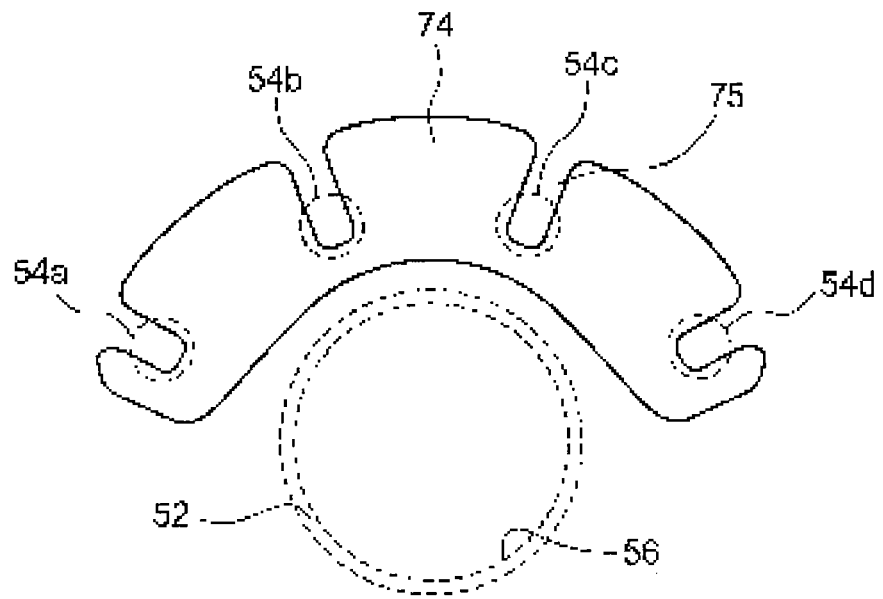
FIG. 9 is a view illustrating an insulation sheet according to the embodiment.

FIG. 9 illustrates the insulation sheet 74 according to the embodiment. The insulation sheet 74 is formed into an approximately arc shape and attached to the surface of the base 50, the surface facing the coil, and in which cutting portions 75 are respectively provided in accordance with the plurality of pull-out holes 54. Specifically, the cutting portions 75 are formed in accordance with the positions and the number of the pull-out holes 54, each of the cutting portions 75 having a shape that is cut from the outer circumferential side of the arc shape toward the radial inside thereof. Part of the circumference of the pull-out hole 54 is covered with the insulation sheet 74. That is, the circumference of the pull-out hole 54 is partially covered with the arc portion of the U-shaped cutting portion 75. The radial width of the insulation sheet 74 is set in accordance with the that of the coil 70 and the circumferential length of the insulation sheet 74 is set in accordance with the interval between the plurality of pull-out holes 54. Processing of the pull-out hole 54 and the circumference thereof is complicated in comparison with that of a planar portion, and accordingly the possibility of being brought into contact with the coil 70 is high due to a processing error, etc. By pasting the insulation sheet 74 around the pull-out hole 54, cost can be suppressed in comparison with the case where the pull-out hole 54 is formed into a circular shape, while the insulation is being efficiently achieved.

Referring back to FIG. 8, the conductive resin material 84 is applied to the area ranging from the base 50 to the bearing unit in order to efficiently remove the static electricity charged in the recording disk 200, thereby allowing the conduction between them to be secured. That is, because the sleeve 80 of the bearing unit is fixed to the bearing hole 56 of the base 50 by non-conductive adhesive, the conduction between the bearing unit and the base 50 can be secured by the conductive resin material 84, thereby allowing the static electricity generated in the bearing unit due to the rotation to be released into the base 50. An example of a conductive resin material according to a comparative example includes one in which an epoxy resin is mixed into silver paste that is a main component. The conductive resin material is cured by the action of a curing agent. That is, the resin material is a two-component conductive resin material. When the two-component conductive resin material is used, migration occurs in the epoxy resin in the course of the curing of the epoxy resin, thereby possibly causing the conductive resin material to be attached around the application area. If an epoxy resin migrates to an area in the black coating of the base and is attached thereto, the luster of the area is only changed and accordingly a difference with other areas is generated, thereby causing the problem that the appearance is deteriorated.

In order to deal with the problem, in the present embodiment, the conduction between the base 50 and the bearing unit is achieved mainly by a conductive resin material excluding an epoxy resin. For example, a conductive resin material excluding an epoxy resin as a resin main component, in which a metallic material having conductivity is included as a metal main component, is used. Specifically, a conductive resin material excluding an epoxy resin is included in a ratio of 80% or more as a resin component. Thereby, the problem that the appearance of the coated area of the base 50 may be deteriorated due to the migration of an epoxy resin is reduced. As a metallic material having conductivity, various materials, such as silver paste, can be used. For example, metallic materials including nickel paste are preferred in terms of less deterioration with age of conductivity and being inexpensive. As a conductive resin material excluding an epoxy resin as a resin main component, various materials can be used. For example, the material with a product number of 3317 made by ThreeBond Co., Ltd. is a conductive resin material including nickel paste as a metal main component and excluding an epoxy resin, and is a one-component type resin material, and hence the material does not need extra labor of mixing two components, etc., thereby being advantageous in mechanizing the application work.

For example, when the base 50 is made of aluminum and the bearing unit is formed of a metallic material, such as brass, there is a great difference between the coefficients of linear expansion and heat capacities of the metallic material and the conductive resin material. Accordingly, a great difference occurs between the thermal expansions and contractions thereof in a so-called heat shock test, thereby causing great stress to be laid on the applied conductive resin material. As a result, there arises the fear that the applied conductive resin material may be peeled off and the conduction between the base 50 and the bearing unit be deteriorated. In order to deal with the problem, it may be made that the conductive resin material 84 is circumferentially applied to the bearing hole 56 and the lower end portion of the bearing unit. Thereby, the conductive resin material can be efficiently applied near to the joint portion between the base 50 and the bearing unit, thereby allowing peeing off of the conductive resin material to be hardly generated. As a result, the possibility that the conduction between the base 50 and the bearing unit may be deteriorated can be reduced even in a heat shock test.

As a result of experiments, when the circumferential length 85 and radial width 86 of the area to which the conductive resin material 84 had been applied were approximately equal to each other, the conduction in each of two out of twenty disk drive devices was deteriorated in a heat shock test. On the other hand, when the circumferential length 85 of the area to which the conductive resin material 84 had been applied was one and half times longer than the radial width 86 thereof, the number of the disk drive devices in which the conduction was deteriorated was reduced to one out of twenty devices. Further, when the circumferential length 85 was two times longer than the radial width 86, the number of the disk drive devices in which the conduction was deteriorated was reduced to zero out of twenty devices. Accordingly, by making the circumferential length of the area to which the conductive resin material had been applied to be one and half times or more longer than the radial width thereof, the possibility that the conduction between the base 50 and the bearing unit may be deteriorated in a heat shock test can be reduced.

As illustrated in FIG. 2, the area to which the conductive resin material 84 has been applied is covered with the sealing member 32. The sealing member 32 seals the opening 56 of the bearing hole 56 and covers the area to which the conductive resin material 84 has been applied and the joint portion between the bearing hole 56 and the bearing unit. Thereby, the conductive resin material 84 and the joint portion between the bearing hole 56 and the bearing unit can be protected. Further, evaporation of the lubricant can be suppressed when the sleeve 80 is formed of a porous sintered metal. The gas generated from the conductive resin material 84 can be confined. The sealing member 32 may have a display area where production information of a disk drive device are displayed. Thereby, production information thereof can be held by the sealing member 32.

Figure 10:
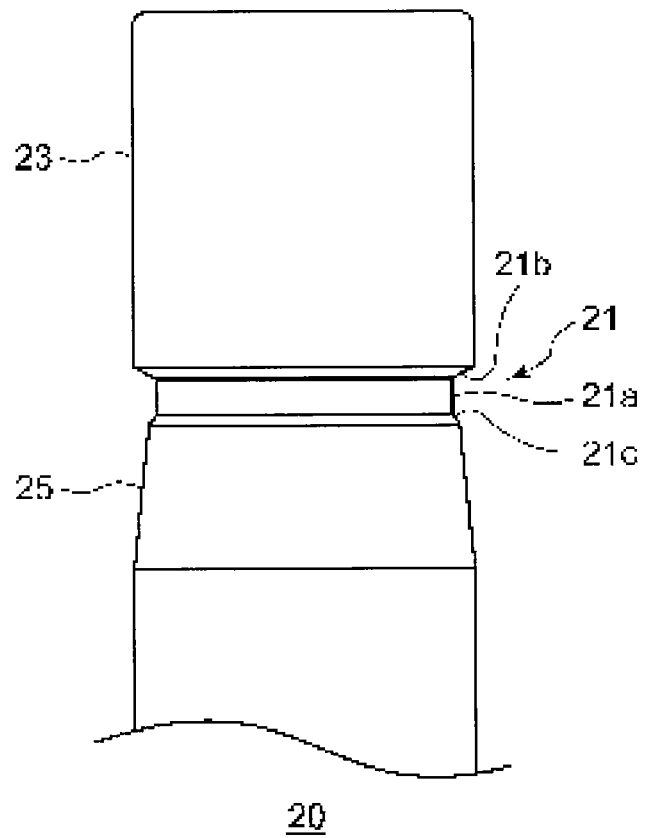
FIG. 10 is a view illustrating the front view of part of a shaft according to the embodiment.

FIG. 10 illustrates the front view of part of the shaft 20 according to the embodiment. The portion above a capillary seal formed portion 25 is illustrated. The shaft 20 includes a hub fixed portion 23, a shaft concave portion 21, and the capillary seal formed portion 25.

As illustrated in FIG. 2, the hub fixed portion 23 is provided at the upper end of the shaft 20 and fixed to the shaft hole 10e. The shaft concave portion 21 is provided adjacently below the hub fixed portion 23, and the capillary seal formed portion 25 is provided adjacently below the shaft concave portion 21. The capillary seal formed portion 25 is formed such that the diameter thereof is reduced toward the axial upside.

The shaft concave portion 21 is formed to be more concaved than the hub fixed portion 23 and the capillary seal formed portion 25. The shaft concave portion 21 includes a cylindrical bottom 21a having a predetermined width, a first step portion 21b provided on the bottom 21a, and a second step portion 21c provided below the bottom 21a.

An oil repellent agent is applied to the shaft concave portion 21 located above the capillary seal formed portion 25. When the oil repellent agent is applied to an area above the capillary seal formed portion 25, the oil repellent agent is sometimes applied to the capillary seal formed portion 25 due to a production error. If the oil repellent agent is adhered thereto, the capillary force of the capillary seal formed portion 25 is decreased.

Because the shaft 20 according to the embodiment has the second step portion 21c between the bottom 21a, which is an area to which the oil repellent agent is applied, and the capillary seal formed portion 25, it can be suppressed that the oil repellent agent may drip off when the oil repellent agent is applied to the bottom 21a. Further, by providing step portions on and below the bottom 21a, the area to which the oil repellent agent is applied can be made clear. Thereby, the application work can be performed easily and it can be prevented that a non-application area may be applied. Alternatively, the oil repellent agent may be applied to the first step portion 21b and the second step portion 21c in addition to the bottom 21a.

Figure 11:
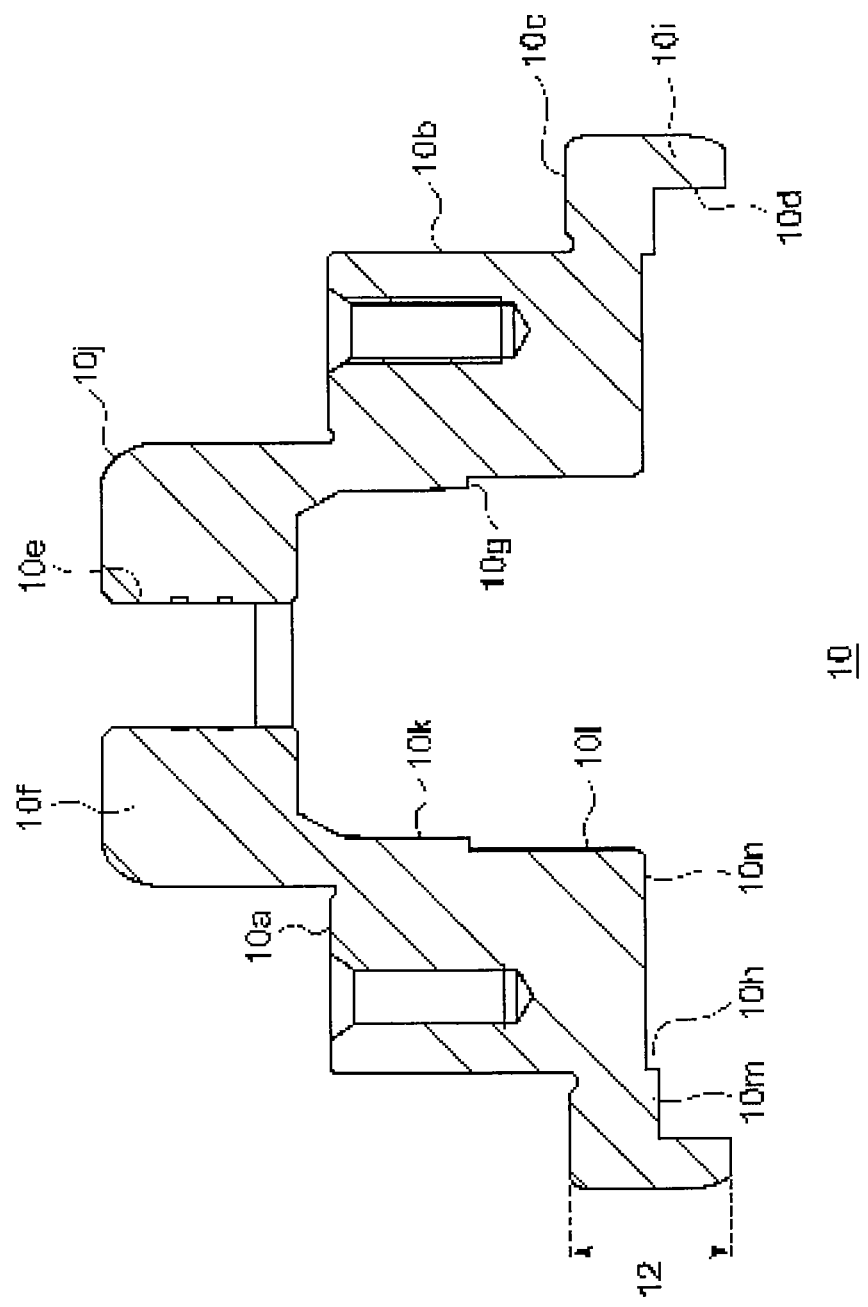
FIG. 11 is a view illustrating the sectional view of a hub according to the embodiment.

FIG. 11 illustrates the sectional view of the hub 10 according to the embodiment. The configurations described in FIG. 2 will be omitted. A circumferential corner portion 10j around the central portion 10f of the hub 10 is formed into a rounded shape. The corner radius R of the circumferential corner portion 10j is set to be 1.0 mm or more and 6.3 mm or less. Thereby, the work for installing the clamper 206 can be easily performed, thereby allowing the clamper 206 to be efficiently installed in the horizontal direction. In addition, the surface roughness Ry of the circumferential corner portion 10j may be set to be smaller than or equal to 1.6 µm. Thereby, the work for installing the clamper 206 can be easily performed.

The hub 10 has, in the inside thereof, a surrounding portion by which the upper portion of the sleeve 80 is surrounded. The surrounding portion has a first surrounding portion 10k located upward and a second surrounding portion 10l located downward. The first surrounding portion 10k is axially adjacent to the second surrounding portion 10l through a first step portion 10g and is formed such that the diameter of the inner circumference thereof is smaller than that of the second surrounding portion 10l. That is, the first surrounding portion 10k is formed such that the gap between the first surrounding portion 10k and the outer circumferential surface of the sleeve 80 is smaller than that between the second surrounding portion 10l and the outer circumferential surface of the sleeve 80.

The first surrounding portion 10k and the first step portion 10g protrude toward the rotational center. On the other hand, the space formed by the second surrounding portion 10l and the outer circumferential surface of the sleeve 80 is formed to be larger than that formed by the first surrounding portion 10k and the outer circumferential surface of the sleeve 80. By making the gap with the sleeve 80 to be small as stated above, the gas generated from the lubricant can be saturated in the space above the first surrounding portion 10k, thereby, allowing the evaporation of the lubricant to be suppressed.

The hub 10 has a second step portion 10h between the surface 10n facing the stator core 60 and the coil 70, and a yoke fixed surface 10m to which the upper end surface of the yoke 30 is fixed. The surface 10n facing the coil 70 is more concaved axially upward than the yoke fixed surface 10m. The space formed by the surface 10n facing the coil 70 and the upper surface of the base 50 is formed such that the axial gap thereof is larger than that of the space formed by the yoke fixed surface 10m and the upper surface of the base 50. There is a technique in which, when torque becomes small due to the miniaturization of the stator core 60, the torque is compensated by forming the coil 70 with more wires, in accordance with the decreased torque, being wound around it; however, when the coil 70 is made large, the possibility that the coil 70 and the hub 10 may be brought into contact with each other is increased. By securing a larger space by the surface 10n facing the coil 70 and the second step portion 10h, the possibility that the coil 70 and the hub 10 may be brought into contact with each other can be reduced.

The annular extending portion 10c of the hub 10 includes a hanging portion 10i that hangs from the mounting surface on which the recording disk 200 is to be mounted. Thereby, the outer circumferential surface of the yoke 30 can be firmly attached to the inner circumferential surface 10d of the hanging portion 10i. As illustrated in FIG. 2, the width-increased portion 51 is formed in the base 50 axially facing the hanging portion 10i, the width-increased portion 51 protruding into the space below the hanging portion 10i. A staircase with two steps is formed from the surface of the base 50, the surface facing the coil 70, and the first step is the width-increased portion 51. Thereby, the stiffness of the base 50 can be increased in comparison with the case where the width-increased portion 51 is not provided.

The lower end surface of the hanging portion 10i is located axially above the axial center of the yoke 30 and the magnet 40. The width-increased portion 51 is formed such that the axial dimension thereof is larger than the axial dimension 12 of the hanging portion 10i. Thereby, the width-increased portion 51 can be formed to be large in size and accordingly the stiffness of the base 50 can be increased, while the surface to which the outer circumferential surface of the yoke 30 is firmly attached is being secured.

Subsequently, after the stator core 60 is press-fitted into the outer circumference of the annular protruding portion 52 of the base 50 in the assembling process of the disk drive device 100, the sleeve 80 (bearing unit) is inserted into the inner circumference of the annular protruding portion 52 (bearing hole 56). The annular protruding portion 52 is sometimes bent toward the rotational center when the stator core 60 has been press-fitted, and hence the sleeve 80 sometimes cannot be inserted smoothly. The outer diameter of the annular protruding portion 52, before press-fitted, is slightly larger than the inner diameter of the stator core 60. The difference between the outer diameter of the annular protruding portion 52 and the inner diameter of the stator core 60, before assembled, is called a press-fitting margin. When the sleeve 80 is forced to be inserted into the annular protruding portion 52, there is the possibility that the sleeve 80 may be installed in a tilted state.

A bending amount of the annular protruding portion 52 toward the rotational center was measured when the stator core 60 was press-fitted into the outer circumference of the annular protruding portion 52 of the base 50. As a result, when the press-fitting margin is within a range of 50 μm or less, a bending amount of the annular protruding portion 52 was changed in accordance with the press-fitting margin and was approximately half the press-fitting margin. Accordingly, the annular protruding portion 52 is provided such that the inner diameter of the bearing hole 56 (annular protruding portion 52), before assembled, is larger than the outer diameter of the sleeve 80 by half the press-fitting margin or more. Thereby, the sleeve 80 can be smoothly inserted into the bearing hole 56 and the possibility that the sleeve 80 may be installed in a tilted state can be reduced.

The sleeve 80 may be formed of a porous material. The internal space of the disk drive device 100, i.e., the space surrounded by the base 50 and the top cover is filled with clean air. For example, the clean air means the air containing more helium than the atmosphere, in which a ratio of low-molecular substances, such as helium, is high. The clean air is likely to pass through pores, and accordingly there is the possibility that the clean air may leak out from an area opened to the atmosphere of the sleeve 80. As an area of the sleeve 80 that may be in contact with the atmosphere, the circumferential lower end portion 83 of the sleeve 80 can be considered. The circumferential lower end portion 83 protrudes downward and the plate 90 is fixed to the inner circumferential surface thereof. By substantially sealing the opening to the atmosphere of the circumferential lower end portion 83, evaporation of the lubricant, etc., can be suppressed.

The circumferential lower end portion 83 may be compressively deformed to seal the opening to the atmosphere thereof. The pores can be processed by compressively deforming the circumferential lower end portion 83. For example, the circumferential lower end portion 83 of the fixed sleeve 80 may be compressively deformed by pressing it with a pressing member. In the process, the work can be easily performed and the production coat can be suppressed. The pores in an area of the circumferential lower end portion 83 to which the plate 90 is fixed may not be sealed.

In addition, the surface of the circumferential lower end portion 83 may be subjected to an oxidation treatment in order to seal the opening to the atmosphere of the circumferential lower end portion 83. Thereby, the pores can be processed more surely. Alternatively, a resin material may be applied to the surface of the circumferential lower end portion 83 in order to seal the opening to the atmosphere thereof. Thereby, the pores on the surface of the circumferential lower end portion 83 can be sealed.

On the other hand, the leak of the clean air may be suppressed by sealing an area opened to the clean air of the sleeve 80. For example, a resin material may be applied to the outer circumferential surface of the sleeve 80 located above the joint portion between the sleeve 80 and the bearing hole 56. Thereby, it can be suppressed that the clean air in the disk drive device 100 may leak out.

Production processes of the disk drive device 100 having such the sleeve 80 will be described. The sleeve 80 is first formed of a porous material. Subsequently, dynamic pressure grooves are formed on the inner circumference of the sleeve 80. Subsequently, the sleeve 80 is sintered by heating. The opening to the atmosphere of the circumferential lower end portion 83 is then sealed by the aforementioned means. Subsequently, the sleeve 80 is placed into a high-temperature tank to remove residual substances therein by exposure to the high-temperature ambient atmosphere. The pores in the sleeve 80 can be sealed by the aforementioned production processes.

Subsequently, the difference in the axial height at every circumferential end 67 of the tooth portion 66 will be discussed. As a result of the experiments by the inventor, it has been confirmed that, when the difference in the axial height among each circumferential end 67 is large, the frequency spectrum of a noise component having the same frequency as that of a torque ripple becomes large. From the discussion by the inventor, the knowledge that the above phenomenon occurs due to the following reason has been acquired: because the magnetic flux distribution in the magnetic 40 is not constant in the axial direction, an amount of the received magnetic flux is different depending on an axial position of the circumferential end 67, resulting in different generated torque. That is, when the difference in the axial height among each circumferential end 67 is large, the degree to which the generated torque is unequal becomes large, and accordingly the drive sound during the rotation becomes large, resulting in noise.

Figure 12:
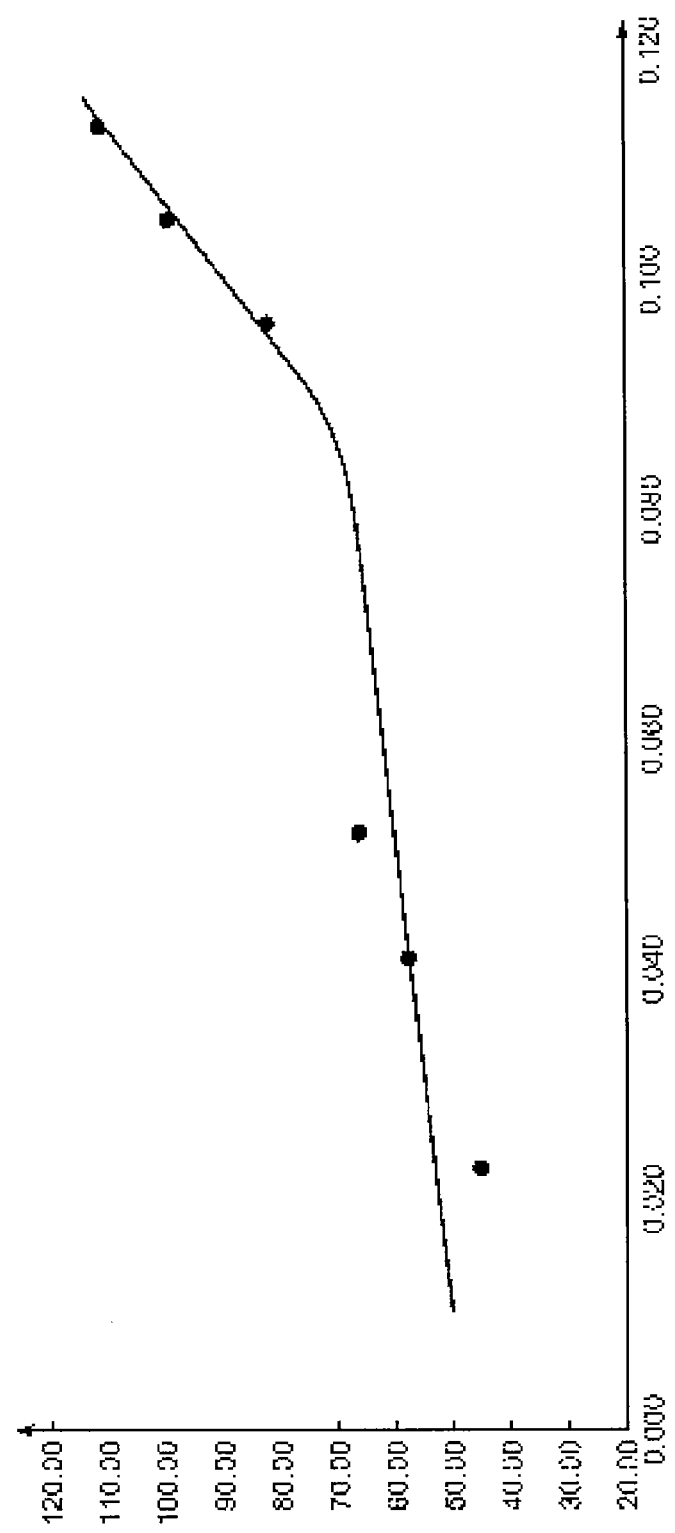
FIG. 12 is a view illustrating an experimental result indicating the relationship between the maximum of the difference in the axial height at every circumferential end and the magnitude of the spectrum of a noise component during the rotation.

FIG. 12 is a view illustrating an experimental result indicating the relationship between the difference in the axial height among each circumferential end 67 and the magnitude of the spectrum of a noise component. The horizontal axis in FIG. 12 represents, in mm, the difference in the axial height among each circumferential end 67, whereas the vertical axis represents the spectrum of a noise component. This spectrum of a noise component is the spectrum having the same frequency as that of a torque ripple during the rotation. The difference in the axial height among each circumferential end 67, illustrated in FIG. 12, is the difference between the maximum and minimum axial heights among the axial height at every circumferential end 67, that is, the difference in the axial height among every upper end portion near to the hub 10.

As illustrated in FIG. 12, it is indicated that, when the difference in the axial height among each upper end portion of each circumferential end 67 becomes large exceeding 0.08 mm after the disk drive device 100 has been assembled, the spectrum of a noise component becomes remarkably large. Accordingly, by providing the stator core 60 such that the difference in the axial height among each upper end portion of each circumferential end 67 near to the hub 10 is 0.07 mm or less, taking into consideration a production error, the spectrum of a noise component can be made small and the drive sound during the rotation can be suppressed. It is more preferable to provide the stator core 60 such that the difference in the axial height among each upper end portion of each circumferential end 67 is 0.05 mm or less. Thereby, the spectrum of a noise component can be made smaller and the drive sound during the rotation can be further suppressed.

In the above discussion, an error in the height of the upper end surface of the tooth portion 66 near to the hub 10 is dealt with. That is, an error in the height of the upper end surface of the tooth portion 66 is managed to be less than or equal to a predetermined value, thereby allowing drive noise to be reduced. Herein, it is also possible to manage an error in the height of the lower end surface of the tooth portion 66 near to the base 50 to be less than or equal to a predetermined value. However, the inner circumferential lower end portion of the stator core 60 is mounted on the step portion provided on the outer circumference of the annular protruding portion 52 of the base 50, and is the basis of the lower end of the stator core 60, and hence an error in the height can be more suppressed than that of the upper end surface of the tooth portion 66. Accordingly, by managing at least the height of the upper end surface of the tooth portion 66 to be less than or equal to a predetermined value, the drive noise during the rotation can be efficiently suppressed.

Even if the difference in the axial height among each upper end portion of each circumferential end 67 is made to be smaller than 0.01 mm, the effect of improving the spectrum of a noise component is small. On the other hand, if the tooth portion 66 is intended to be produced such that an error in the height of the upper end surface thereof is smaller than 0.01 mm, special labor, such as sorting, is needed and cost is increased. Accordingly, the stator core 60 is provided so as not to be managed to the degree in which the difference in the axial height among each upper end portion of each circumferential end 67 is made to be smaller than 0.01 mm. Thereby, the production cost can be suppressed. The axial height of the upper end portion of each circumferential end 67 may be managed with the central axis of the salient pole 63 being the basis.

A method of producing such the disk drive device 100 will be described. The stator core 60 is formed by laminating multiple thin electromagnetic steel plates and by integrating them with caulking in a first die. If the pressure is unequal in such caulking, an error in the axial height of each tooth portion 66 is sometimes becomes large. Accordingly, the method of producing the disk drive device 100 may comprise, after the caulking in the first die, pressing at least the tooth portion 66 from up and down sides with two planes of a second die, which are parallel to each other. All the tooth portions 66 of each salient pole 63 are simultaneously pressed with the second die. Thereby, even if the pressure is unequal in the caulking, an error in the axial height of the tooth portion 66 can be made small.

In addition, insulating coating is performed on the surface of the tooth portion 66 by a coating material for electro-deposition coating or powder coating, etc. If the tooth portion 66 of the stator core 60, on which the insulating coating has been performed, is pressed by sandwiching it with the second die, the difference in the axial height among each circumferential end 67 is sometimes becomes large in accordance with an error in the thickness of the insulating coating. Accordingly, the insulating coating is not performed on the tooth portion 66 before pressed by the second die, and after the process in which at least the tooth portion 66 is sandwiched and pressed by the second die, performing the insulating coating on at least the surface of the tooth portion 66 by a coating material may be comprised. Thereby, an error in the axial height among each circumferential end 67 can be made small and the drive noise during the rotation can be suppressed. In addition, the axial height among the upper end portion of each circumferential end 67 is managed by an inspection of the stator core 60 on which the insulating coating has been performed.

Figure 13:
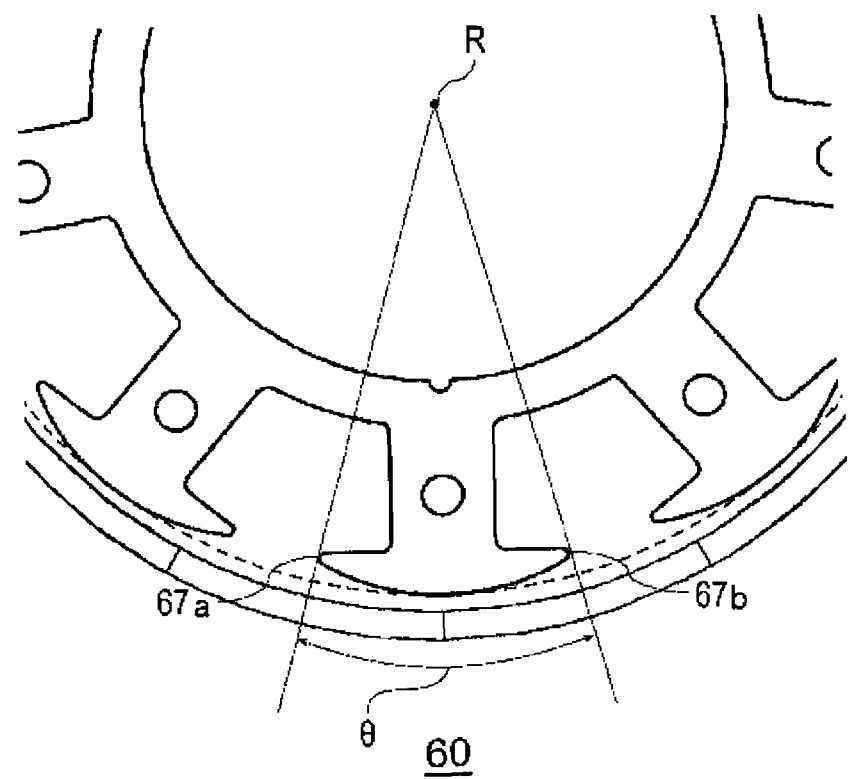
FIG. 13 is a view illustrating the detail of a tooth portion of the stator core illustrated in FIG. 4C.

FIG. 13 is a view illustrating the detail of the tooth portion 66 of the stator core 60 illustrated in FIG. 4C. If the angle θ formed with the rotational center R being sandwiched by one circumferential end 67a and the other circumferential end 67b of the tooth portion 66 is too small, the magnetic flux that the tooth portion 66 receives from the magnet pole of the magnet 40 is decreased, and accordingly the dive torque is sometimes decreased. To deal with this problem, the stator core 60 according to the embodiment is provided such that the number of the magnetic poles of the magnet 40 is twelve and the angle 8 formed with the rotational center R being sandwiched by one circumferential end 67a and the other circumferential end 67b of the tooth portion 66 is approximately 32 degrees. Herein, the "approximately" of the above approximately 32 degrees includes a production error and allows an error of approximately±one degree. It has been confirmed that, when the angle θ is within a range of 30 to 34 degrees, cogging torque and a torque ripple can be reduced, and a decrease in the drive torque can also be suppressed. When the angle θ is generalized assuming that the number of the magnet poles of the magnet 40 is P (wherein P is an even number of four or more), the angel θ formed with the rotational center R being sandwiched by one circumferential end 67a and the other circumferential end 67b of the tooth portion 66 is set to be approximately 384/P degrees.

The disk drive device 100 according to the embodiment, in which the recording disks 200 each having a thickness of 1.27 mm are to be mounted, has been described; however, the disk drive device 100 is not limited thereto. For example, the thickness of a recording disk may be made to be 1.4 mm or more. Such a recording disk is preferred because a vibration in the recording disk can be suppressed by a change in the resonance frequency thereof. Alternatively, the thickness thereof may be made to be 1.7 mm or more. Thereby, a vibration in the recording disk can be further suppressed.

The disk drive device 100 according to the embodiment, in which the number of the magnet poles of the magnet 40 is twelve and the number of the salient poles is nine, has been described; however, the disk drive device 100 is not limited thereto. The number of the magnet poles of the magnet is made to be an even number of 10 to 16 and the number of the salient poles is made to be a multiple number of three of 12 to 24. Thereby, the total number of coil windings can be made large even when the magnet is miniaturized, and an increase in the cogging torque can be suppressed by making the gap between the magnet and the salient pole larger by just that much, thereby allowing a vibration occurring during the drive to be reduced.

An integrated disk drive device in which the base rotatably supports the hub has been described as the disk drive device 100 according to the embodiment; however, the disk drive device 100 is not limited thereto. For example, a motor according to the embodiment, which has been separately produced, may be attached to the chassis in the hard disk drive.

A so-called outer rotor disk drive device in which the magnet is located outside the laminated core has been described as the disk drive device 100 according to the embodiment; however, the disk drive device is not limited thereto. The technical idea according to the embodiment may be applied to the production of, for example, a so-called inner rotor disk drive device in which a magnet is located inside a laminated core.

A disk drive device in which the sleeve is fixed to the base and the shaft is rotated relative to the sleeve has been described as the disk drive device 100 according to the embodiment; however, the disk drive device is not limited thereto. The technical idea according to the embodiment may be applied to, for example, a shaft-fixed type disk drive device in which a shaft is fixed to a base, and a sleeve and a hub are rotated relative to the shaft.

In the embodiment, the disk drive device 100 mainly used in a hard disk drive has been described; however, the motor according to the embodiment may be mounted in an optical disk recording/reproducing device, such as CD (Compact Disc) device and DVD (Digital Versatile Disc) device, etc.

The present invention has been described based on the preferred embodiments, which are only intended to illustrate the principle and applications of the invention, and it is needless to say that a variety of modifications and variations in arrangement may be made to the embodiments within the range not departing from the spirit of the invention specified in appended claims.

What is claimed is:

1. A rotating machine comprising:
   a hub on which a recording disk is to be mounted;
   a base configured to rotatably support the hub through a bearing;
   a stator core that is fixed to the base and includes an annular portion and a salient pole radially extending from the annular portion; and
   a magnet that faces the salient pole radially and is rotated with the hub,
   wherein the magnet has a plurality of magnetic poles in a circumferential direction such that each of the plurality of magnetic poles faces the salient poles,
   wherein the salient pole includes a rod-shaped body around which a wire is wound and a tooth portion that is provided radially outside the rod-shaped body and extends circumferentially,
   wherein a circumferential end located at the end in the circumferential direction of the tooth portion is located radially inside a circumscribed circle passing through a tip located at a radially outermost end of the tooth portion, and
   wherein a diameter of the circumscribed circle passing through the tip is D1, a diameter of an inscribed circle passing through an inner circumference of the circumferential end is D2, a diameter of an outer circumference of the magnet is D3, and a diameter of an inner circumference of the magnet is D4, such that:

$(D3-D4)/3 < D1-D2 < D3-D4$.

2. The rotating machine according to claim 1, wherein an outer circumferential surface of the tooth portion is formed into an arc shape, and
   wherein a curvature radius of the arc shape is smaller than that of the circumscribed circle radius passing through the tip.

3. The rotating machine according to claim 2, wherein the curvature radius of the arc shape of the outer circumferential surface of the tooth portion is approximately half that of the circumscribed circle radius passing through the tip.

4. The rotating machine according to claim 1, wherein a circumferential dimension of the magnet pole of the magnet is approximately three times that of a space between the two tooth portions circumferentially adjacent to each other.

5. The rotating machine according to claim 1, wherein the circumferential end is located radially inside an outer diameter portion of a disk fitting portion of the hub into which an inner circumference of the recording disk is fitted.

6. The rotating machine according to claim 5, wherein the tip located at the radially outermost end of the tooth portion is located radially inside the outer diameter portion of the disk fitting portion of the hub.

7. The rotating machine according to claim 1, wherein the stator core is installed such that a difference in the axial height among each end portion at each circumferential end near to the hub is 0.01 mm or more and 0.07 mm or less.

8. The rotating machine according to claim 1, wherein the tooth portion is formed by being sandwiched and pressed with planes of a die.

9. The rotating machine according to claim 8, wherein after the tooth portion has been pressed by the die, insulating coating is performed on the surface of the tooth portion.

10. The rotating machine according to claim 1, wherein the wire wound around the rod-shaped body forms a coil, and when the hub is rotated in a state where the coil is not powered, a back electromotive force generated in the coil has a curve close to a sine curve in comparison with the case where the circumferential end located at the end in the circumferential direction of the tooth portion is located in the circumscribed circle passing through the tip.

11. The rotating machine according to claim 1, wherein assuming that the number of the magnetic poles of the magnet is P (wherein P is an even number of four or more), such that the angle θ formed with the rotational center R being sandwiched by one circumferential end and the other circumferential end of the tooth portion is approximately 384/P degrees.

12. A rotating machine comprising:
    a hub on which a recording disk is to be mounted;
    a base configured to rotatably support the hub through a bearing;
    a stator core that is fixed to the base and includes an annular portion and a salient pole radially extending from the annular portion; and
    a magnet that faces the salient pole radially and is rotated with the hub,
    wherein the magnet has a plurality of magnetic poles in a circumferential direction such that each of the plurality of magnetic poles faces the salient poles,
    wherein the salient pole includes a rod-shaped body around which a wire is wound and a tooth portion that is provided radially outside the rod-shaped body and extends circumferentially,
    wherein a circumferential end located at the end in the circumferential direction of the tooth portion is located radially inside a circumscribed circle passing through a tip located at a radially outermost end of the tooth portion, and wherein the stator core is installed such that a difference in the axial height among each end portion at each circumferential end near to the hub is 0.01 mm or more and 0.07 mm or less.

13. The rotating machine according to claim 12, wherein an outer circumferential surface of the tooth portion is formed into an arc shape, wherein a curvature radius of the arc shape is smaller than that of the circumscribed circle radius passing through the tip, and wherein the curvature radius of the arc shape of the outer circumferential surface of the tooth portion is approximately half that of the circumscribed circle radius passing through the tip.

14. The rotating machine according to claim 12, wherein a circumferential dimension of the magnet pole of the magnet is approximately three times that of a space between the two tooth portions circumferentially adjacent to each other.

15. The rotating machine according to claim 12, wherein the circumferential end is located radially inside an outer diameter portion of a disk fitting portion of the hub into which an inner circumference of the recording disk is fitted, and wherein the tip located at the radially outermost end of the tooth portion is located radially inside the outer diameter portion of the disk fitting portion of the hub.

16. The rotating machine according to claim 12, wherein the wire wound around the rod-shaped body forms a coil, and when the hub is rotated in a state where the coil is not powered, a back electromotive force generated in the coil has a curve close to a sine curve in comparison with the case where the circumferential end located at the end in the circumferential direction of the tooth portion is located in the circumscribed circle passing through the tip.

17. A rotating machine comprising:
a hub on which a recording disk is to be mounted;
a base configured to rotatably support the hub through a bearing;
a stator core that is fixed to the base and includes an annular portion and a salient pole radially extending from the annular portion; and
a magnet that faces the salient pole radially and is rotated with the hub, wherein the magnet has a plurality of magnetic poles in a circumferential direction such that each of the plurality of magnetic poles faces the salient poles, wherein the salient pole includes a rod-shaped body around which a wire is wound and a tooth portion that is provided radially outside the rod-shaped body and extends circumferentially, wherein a circumferential end located at the end in the circumferential direction of the tooth portion is located radially inside a circumscribed circle passing through a tip located at a radially outermost end of the tooth portion, and wherein a circumferential dimension of the magnet pole of the magnet is approximately three times that of a space between the two tooth portions circumferentially adjacent to each other.

18. The rotating machine according to claim 17, wherein an outer circumferential surface of the tooth portion is formed into an arc shape, wherein a curvature radius of the arc shape is smaller than that of the circumscribed circle radius passing through the tip, and wherein the curvature radius of the arc shape of the outer circumferential surface of the tooth portion is approximately half that of the circumscribed circle radius passing through the tip.

19. The rotating machine according to claim 17, wherein the circumferential end is located radially inside an outer diameter portion of a disk fitting portion of the hub into which an inner circumference of the recording disk is fitted, and wherein the tip located at the radially outermost end of the tooth portion is located radially inside the outer diameter portion of the disk fitting portion of the hub.

20. The rotating machine according to claim 17, wherein the wire wound around the rod-shaped body forms a coil, and when the hub is rotated in a state where the coil is not powered, a back electromotive force generated in the coil has a curve close to a sine curve in comparison with the case where the circumferential end located at the end in the circumferential direction of the tooth portion is located in the circumscribed circle passing through the tip.

\* \* \* \* \*